United States Patent [19]

Nobutoki et al.

[11] 4,100,570
[45] Jul. 11, 1978

[54] OPTICAL IMAGE PICKUP SYSTEM

[75] Inventors: Saburo Nobutoki, Mobara; Yukio Okano, Osaka, both of Japan

[73] Assignees: Hitachi, Ltd.; Minolta Camera Co., Ltd., both of Japan

[21] Appl. No.: 660,781

[22] Filed: Feb. 24, 1976

[30] Foreign Application Priority Data

Mar. 12, 1975 [JP] Japan .................................. 50-28977

[51] Int. Cl.² .............................................. H04N 9/07
[52] U.S. Cl. ........................................ 358/44; 358/55
[58] Field of Search ............................ 358/44, 43, 55; 350/162 SF, 162 R, 157, 158

[56] References Cited

U.S. PATENT DOCUMENTS

| 3,910,683 | 10/1975 | Nishino et al. | 350/162 SF |
| 3,940,788 | 2/1976 | Abe et al. | 358/55 X |

*Primary Examiner*—Richard Murray
*Attorney, Agent, or Firm*—Craig & Antonelli

[57] ABSTRACT

An optical image pickup system for reducing spurious color signals generated in an image pickup system including a stripe-shaped color separation or color encoding filter, wherein a double refraction plate and a diffraction grating spatial frequency filter are arranged serially in an optical path to maintain a high resolution power in the luminance band and at the same time present a sufficient reduction of the spurious color signal.

14 Claims, 4 Drawing Figures

OPTICAL IMAGE PICKUP SYSTEM

BACKGROUND OF THE INVENTION

1. Field of the Invention

The present invention relates to an optical image pickup system and more particularly to an optical system of a color television camera using a stripe-shaped color separation filter.

2. Description of the Prior Art

In general, in a single or dual tube type color television camera including a stripe-shaped color separation filter, an image bearing light from an object is separated into components of red, blue and etc., by the stripe-shaped color separation filter, and the separated light is directed onto a photo conductive film which is, in turn, scanned by an electron beam radiated from an electron gun to produce video signals corresponding to the respective color components from a signal electrode.

When the image of the object is formed on the stripe-shaped color separation filter, if the image of the object includes a frequency component which is identical to the spatial frequency of the stripe-shaped color separation filter, a chrominace signal of the image of the object may be erroneously taken independently of the color inherent in the object due to crosstalk between a luminance signal of said frequency component which is derived from a photo-electro conversion plate of the camera tube and the chrominance signal of the image of the object, because in the television camera of this type a pattern of the stripe-shaped color separation filter is projected on the photo-electric conversion plate so that the pattern of the stripe-shaped color separation filter is substantially superimposed on the object image formed on the photo-electro conversion plate. In other words, the object image is taken as a spurious color signal so that the reproduced image is miscolored. This phenomenon is observed in a single tube type or dual-tube type color television camera using the stripe-shaped color separation filter and is particularly remarkable in the single tube type.

Various approaches have been proposed to resolve the above problem, typical ones of which are given below.

First, it has been proposed to arrange a double refraction plate in the image pickup path of the television camera which uses the stripe-shaped color separation filter, for producing a so-called optically defocussed image for the spatial frequency component corresponding to the spatial frequency of the stripe-shaped color separation filter, while maintaining as high a sharpness of image as possible for the spatial frequency band (hereinafter referred to as the luminance band) which is lower than the frequency band to which said spatial frequency belongs (hereinafter referred to as the chromaticity band). The double refraction plate which forms an optical low pass filter by making use of the double refraction property thereof may be a quartz plate, a calcite plate or a plate of LiNbO$_3$, which divides an incident ray into two optical paths for abnormal rays and normal rays to attain the above object. A curve A shown in FIG. 1 represents an optical transfer function or a response function (MTF) R(f) (hereinafter referred to as the response function) obtained by this method, in which R(f)$_A$ which means the R(f) for the curve A is given by the following equation;

$$R(f)_A = \left| \cos\left(\frac{\pi}{2} \cdot \frac{f}{f_o}\right) \right| \quad (1)$$

where $f$ is the spatial frequency, and $f_o$ is a trap frequency which results in $R(f)_A = 0$. The trap frequency $f_o$ is determined by indexes of refraction for the normal ray and abnormal ray of the double refraction plate, angle of crystal cut with respect to crystal axis of the plate and the thickness thereof. For the purpose of supressing the spurious color signal of frequency $f_o$ is set between the frequencies $f_1$ and $f_2$ in the chromaticity band.

As seen from the curve A of FIG. 1 and the equation (1) above, this type of optical system has a relatively high resolution power in the luminance band resulting in a sharp image, but presents a relatively small reduction of spurious signals because the trap frequency $f_o$ which causes $R(f)_A = 0$ usually lies within the color signal carrier band $f_1 \sim f_2$ and the sharpness of image abruptly increases for the frequencies above and below the frequency $f_o$. In a two-frequency separation type single tube color television camera system which has a relatively broad chromaticity band such as 3.0 MHz – 6.5 MHz, the reduction of the spurious signal tends to be insufficient.

Secondly, a diffraction grating spatial frequency filter system has been proposed in which the spurious signal is suppressed by making use of the light diffraction effect by a brightness grating or a phase grating. As the grid arrangement of the grating, one-dimensional or two-dimensional, square wave or sine wave phase grating array, or a random distribution grating is frequently used. The curve B in FIG. 1 shows a response function (MTF) R(f) obtained when the filter comprising a square wave phase grating is used. R(f)$_B$ represents the function R(f) for the curve B, and the following equations are given for the curve B;

$$f_a = a/\lambda b$$

$$Q = 1 - \frac{2a}{X}(1 - \cos\delta)$$

When $0 \leq f \leq f_Q$, $$R(f)_B = -\frac{1-Q}{f_a}f + 1 \quad (2)$$

When $f_Q \leq f \leq f_p$, $$R(f)_B = Q \quad (3)$$

where
- $a$: width of a portion which causes phase retardation $\delta$ of the grating
- $b$: converted distance between image planes of the grating,
- $X$: period of the grating,
- $\delta$: phase retardation of a wave plane by the phase grating, which is given by $$\delta = \frac{2\pi}{\lambda}(n - n')d$$

$\lambda$: light wavelength $n$: index of refraction of the phase grating forming material
$n'$: index of refraction of medium
$d$: thickness of the phase grating
$fa$: cutoff frequency
$f_p$: frequency at which the response function starts to rise again.

According to this optical system, as seen from FIG. 1 and the equations (2) and (3) above, although substantially sufficient reduction of the spurious color signals can be attained over the entire range of the chromaticity band by design approach, when $fa$ is set equal to $fo$, sufficient resolution power cannot be attained in the luminance band having a lower frequency.

SUMMARY OF THE INVENTION

It is, therefore, an object of the present invention to provide an optical image pickup system capable of providing substantially sufficient reduction of spurious signals over the entire range of the chromaticity band, without providing reduction of resolution power, which reduction remarkably deteriorates the image quality, in the luminance band having frequencies lower than the trap frequency.

After extensive experiments the inventors of the present invention found that when said first and second types of optical low pass filters are arranged serially, at least one for each type, in the optical image pickup path, sufficient reduction of the spurious signal is attained while maintaining high resolution power in the luminance band. This is because an overall response function when both types of low pass filters are arranged serially is given by the product of both functions.

DESCRIPTION OF THE PREFERRED EMBODIMENTS

The above and other objects, advantages and features of the present invention will become more apparent from the following detailed description of the preferred embodiments of the invention when taken in conjunction with the accompanying drawings.

Figure 2:
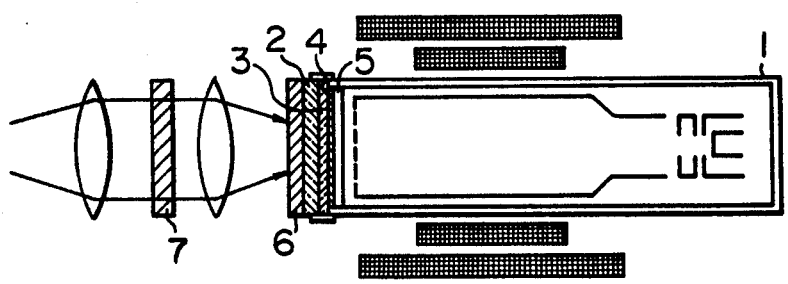
FIG. 2 shows one embodiment of an optical image pickup system of the present invention.

Referring to FIG. 2, a known single color image pickup tube 1 including a filter therein is shown as having a transparent glass window 2, a stripe-shaped color separation filter 3, a transparent conductive film 4 and a photo conductive film 5. A double refraction plate 6 of an optical low pass filter in accordance with the present invention is arranged in proximity of an imaging plane considering the function thereof. In this way the optical system can be constructed in small size and light weight. A diffraction grating space frequency filter 7 which constitutes a second low pass filter should not be arranged in proximity to the imaging plane in order to prevent the shade image of the grating per se from affecting the imaging plane to deteriorate the image quality. It is, therefore, preferably built in the pickup lens system during manufacture.

Figure 3:
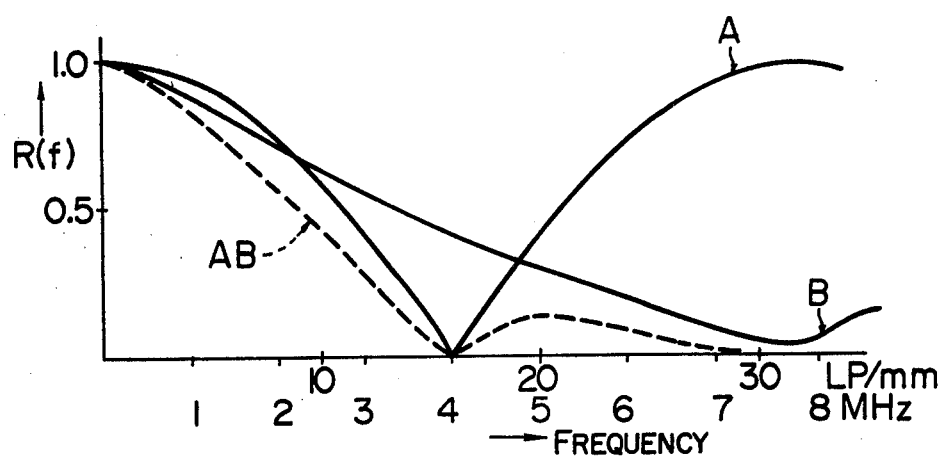
FIGS. 3 and 4 show characteristics of two kinds of embodiments of the present invention.

Curve AB shown in FIG. 3 is an overall response obtained when the both types of low pass filters are arranged serially in the optical path and it is represented by $R(f)$. Curves A and B show the responses when the double refraction plate is used and when the diffraction grating spatial frequency filter with the phase grating is used, respectively. The overall response $R(f)$ in the drawing can be given by the following equation based on the equations (1) and (2).

$$R(f) = |R(f)_A \times R(f)_B|$$

It has been found that so far as the overall response $R(f)$ has a value equal to or smaller than 0.2 in the chromaticity band, the resolution power in the chromaticity band can be reduced to a required range without materially sacrificing the resolution power in the chromaticity band to substantially suppress the generation of the spurious signal.

Namely, it is required that in the range of $f < f_Q$;

$$R(f) = |\text{Cos}(\frac{\pi}{2} \cdot \frac{f}{f_o}) \cdot (1 - \frac{1 - Q_f}{f_Q})| \leq 0.2$$

and in the range of $f < f_Q$, $$R(f) = |Q \cdot \text{Cos} \frac{\pi}{2} \cdot \frac{f}{f_o}| \leq 0.2$$

Figure 1:
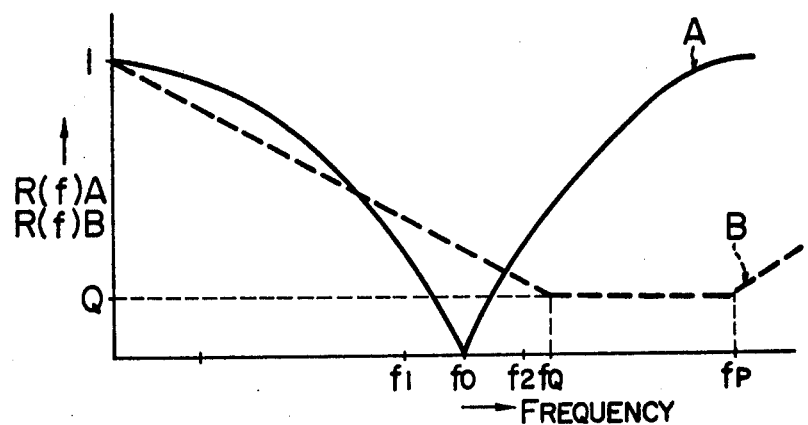
FIG. 1 shows characteristics of two kinds of prior arts optical image pickup system.

The diffraction grating spatial frequency filter may be subjected to various design changes as described above so that the curve of $R(f)_B$ can be changed as desired. Since $\lambda$ cannot be maintained at essentially constant when the color television camera is actually applied, phenomenon due to chromatic aberration occurs and the actual response function does not present a combination of simple straight lines as shown by the curve B in FIG. 1. In a general expression, the following equation should be satisfied in the chromaticity band;

$$R(f) = |R(f)_A \times R(f)_B| \leq 0.2 \qquad (4)$$

In the vicinity of the above condition, an optimum value was experimentarily sought resulting in the following. First, if the lower limit frequency $f_1$ of the chromaticity band is not maintained relatively high, the response function of the luminance band frequency, and hence the resolution power of the television image are decreased and a sharp image cannot be produced. In order to avoid this problem, it has been found that the overall response function $R(f)$ at $f_1$ is set to meet the requirement of $R(f) > R(f_2)$, and more preferably the following equation;

$$R(f_1) = R(f_1)_A \cdot R(f_1)_B \geq 0.1 \qquad (5)$$

Secondly, considering the response function $R(f)_C$ for the image pickup lens, the resolution power thereof at the upper limit frequency $f_2$ of the chromaticity band is generally lower than that at the lower limit frequency $f_1$ and in one example the former is about 70% of the latter. That is, it may occur that $R(f_2)_C \doteq 0.7 R(f_1)_C$. On the other hand, since the occurence of spurious signals naturally depends on the overall response function of the camera optical system, the equation (4) has the substantial effect of reducing spurious color signals in the form of;

$$|R(f)_A \times R(f)_B \times R(f)_C| \leq 0.2$$

and the equation (5) has the same in the form of:

$$R(f_1) = R(f_1)_A \times R(f_1)_B \times R(f_1)_C \leq 0.15$$

Examples of the present invention are given below.

EXAMPLE 1

In an optical image pickup system wherein a single tube color television image pickup system where $f_1 = 13$ line pairs/mm (LP/mm) (which corresponds to about 3.3 MHz when scanned by a Japanese standard television system with a 1-inch image pickup tube), and $f_2 = 23$ LP/mm. (which corresponds to about 5.7 MHz when scanned by a Japanese standard television system with a 1-inch image pickup tube), an optical low pass filter with a double refraction plate in which $fo = 16$ LP/mm (which corresponds to about 4.0 MHz when scanned by the Japanese standard television system with a 1-inch image pickup tube), and a diffraction grating spatial frequency filter comprising a squqre wave phase grating in which $f_Q \div 36$ LP/mm ($Q \div 0.05$) for the light of 546 m$\mu$, are arranged serially, the response function was measured by the green measuring light having the wavelength of 546 m$\mu$ to obtain the curves shown in FIG. 3. The color television image pickup by this optical system showed that even when the television resolution power test chart was used as the worst object which most remarkably generated the spurious color signal, the spurious color signal could be substantially sufficiently eliminated and yet the required sharpness and the clearness of the image was substantially maintained in the luminance band. The resolution power to a white light ray in the chromaticity band of this spurious signal suppression optical system did not exceed 20% but showed about 18% at $f_1$, about 0% at $fo$, and about 12% at $f_2$.

EXAMPLE 2

Figure 4:
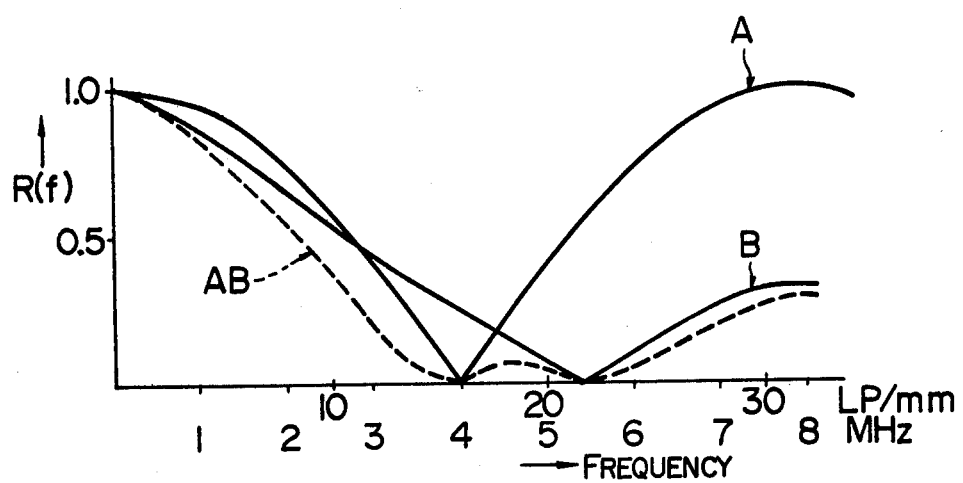

The same design of low pass filter using the double refraction plate as that used in the television system of the Example 1 was employed while the characteristic of the diffraction grating spatial frequency filter was set as follows:

In the optical image pickup system in which a square wave phase grating wherein $f_Q \div 21$ LP/mm ($Q \div -0.25$) for the light having wavelength of 546 m$\mu$ is arranged serially, the response function was measured by the measuring light having wavelength of 546 m$\mu$ to obtain the characteristic curve AB shown in FIG. 4. The color television image pickup by this optical system showed that when the effect of the reduction of the spurious signal was observed using the same object as in the Example 1, no appreciable spurious signals were observed. However, the decrease in the resolution power was observed to be somewhat remarkable, which was considered to be due to the remarkable decrease in the response function in the luminance band, and the sharpness of the reproduced image was lacking. The resolution power to the white light ray in the chromalicity band of this spurious signal suppression optical system generally did not exceed 10% but showed about 10% at $f_1$, about 0% at $fo$ and about 5% at $f_2$.

While the double refraction plate and the diffraction grating spatial frequency filter were arranged one for each in the above examples, they may be arranged more than one for each to attain the intended object so long as the other design factors are properly selected.

The present invention may also be applicable when it is desired to reduce photographic particles or when it is desired to eliminate the so-called "moire" pattern which appears when the original image reproduced by the mesh points and the scan lines in the phtoengraving television image pickup is again subjected to the television image pickup.

While the above embodiments showed the optical system of two-frequency, frequency separation type, single-tube color television camera, the present invention should not be limited thereto but it is also effective in the system wherein the chrominance signal is obtained by the number of the color carriers, the number of the image pickup tubes used or the phase discrimination of the color carriers, and the reduction of spurious signals is attained in the respective color carrier band by selecting the constants within the scope of the present invention. Further, the present invention is not limited to the field of color television but it can be applicable to any system wherein a color signal is obtained by an image which has been spatially modulated by a stripe filter. Namely, the present invention is applicable to, e.g., the field of color facsimile which uses a stripe filter.

Regarding the location of the stripe filter in the optical image pickup system, it is located at a position substantially optically in contact with a photo-electric conversion plane of the image pickup tube in the system using the filter-containing image pickup tube, but the same concept can be applied to a so-called relay lens system single-tube color camera in which the object image is focused on the plane on which the stripe filters are arranged and the focused image and the stripe filters are further focused on the photo-electric conversion plane by the relay optical system.

Regarding the double refraction type optical low pass filter, various types have been proposed by the inventors of the present invention, and regarding the diffraction type optical low pass filter many types such as one-dimensional array, two-dimensional array or improvement thereof have also been proposed by the inventors, and it should be understood that the present invention can be constructed by the combination of those low pass filters.

What is claimed is:

1. An optical image pickup system having an optical transfer function including a stripe-shaped color separation filter, comprising at least one double refraction plate and at least one diffraction grating spatial frequency filter arranged serially in an optical image pickup path, thereby reducing the optical transfer function of said optical image pickup system in at least the chromaticity band spatial frequency range.

2. An optical image pickup system according to claim 1, wherein said optical transfer function R(f) in said chromaticity band is defined by $R(f) \leq 0.2$.

3. An optical image pickup system according to claim 2, wherein the optical transfer function $R(f_2)$ at the upper limit frequency $f_2$ in said chromaticity band is smaller than or equal to the optical transfer function $R(f_1)$ at the lower limit frequency $f_1$ in said chromaticity band, i.e., $$R(f_1) \geq R(f_2).$$

4. An optical image pickup system according to claim 2 wherein the optical transfer function $R(f_1)$ at the lower limit frequency in said chromaticity band is defined by $R(f_1) \geq 0.1$.

5. An optical image pickup system according to claim 1 wherein said double refraction plate is arranged closer to the image pickup tube than said diffraction grating spatial frequency filter.

6. An optical image pickup system according to claim 1 wherein said diffraction grating spatial frequency filter is built in an image pickup lens system.

7. An optical image pickup system according to claim 1 wherein said double refraction plate is made of a material selected from a group essentially consisting of quartz, calcite and $LiNbO_3$.

8. An optical image pickup system according to claim 1 wherein said double refraction plate comprises two materials selected from a group essentially consisting of quartz, calcite and $LiNbO_3$.

9. An optical image pickup system according to claim 8 wherein said diffraction grating spatial frequency filter is a one-dimensional array.

10. An optical image pickup system according to claim 8 wherein said diffraction grating spatial frequency filter is a two-dimensional array.

11. An optical image pickup system according to claim 8 wherein said diffraction grating spatial frequency filter is a random array.

12. An optical image pickup system according to claim 1 wherein said diffraction grating spatial frequency filter is a square wave phase grating.

13. An optical image pickup system according to claim 1 wherein said diffraction grating spatial frequency filter is a sine wave phase grating.

14. An optical image pickup system including a stripe-shaped color separation filter, comprising at least one double refraction plate and at least one diffraction grating spatial frequency filter arranged serially in an optical image pickup path, an overall optical transfer function $R(f)$ representative of the product of an optical transfer function of said double refraction plate and an optical transfer function of said diffraction grating spatial frequency filter being determined as $R(f) \leq 0.2$ in a chromaticity band spatial frequency range.

* * * * *